United States Patent
Kim

(10) Patent No.: US 11,773,268 B2
(45) Date of Patent: Oct. 3, 2023

(54) SYSTEM AND METHOD FOR REFINEMENT OF CHAR AND MANUFACTURE OF REGENERATED CARBON BLACK THROUGH WASTE TIRE PYROLYSIS

(71) Applicant: LD CARBON CO., LTD., Gimcheon (KR)

(72) Inventor: Hyung Tae Kim, Seoul (KR)

(73) Assignee: LD CARBON CO., LTD., Gimcheon-si (KR)

( * ) Notice: Subject to any disclaimer, the term of this patent is extended or adjusted under 35 U.S.C. 154(b) by 569 days.

(21) Appl. No.: 16/960,872

(22) PCT Filed: Dec. 21, 2018

(86) PCT No.: PCT/KR2018/016464
§ 371 (c)(1),
(2) Date: Jul. 8, 2020

(87) PCT Pub. No.: WO2019/139278
PCT Pub. Date: Jul. 18, 2019

(65) Prior Publication Data
US 2020/0339819 A1    Oct. 29, 2020

(30) Foreign Application Priority Data
Jan. 9, 2018   (KR) .................. 10-2018-0002790

(51) Int. Cl.
| | | |
|---|---|---|
| C09C 1/48 | (2006.01) |
| B29B 17/04 | (2006.01) |
| C09C 1/58 | (2006.01) |
| C10B 53/07 | (2006.01) |
| C10B 57/00 | (2006.01) |

(52) U.S. Cl.
CPC .......... C09C 1/482 (2013.01); B29B 17/0404 (2013.01); C09C 1/58 (2013.01); C10B 53/07 (2013.01); C10B 57/005 (2013.01); *C01P 2004/32* (2013.01)

(58) Field of Classification Search
CPC ..................................... C09C 1/482
See application file for complete search history.

(56) References Cited

U.S. PATENT DOCUMENTS 5,728,361 A * 3/1998 Holley .................... C10B 53/07
423/449.6
2012/0263641 A1   10/2012 Chung et al.

FOREIGN PATENT DOCUMENTS

| JP | 2003-277762 A | 10/2003 |
| KR | 10-1213754 A | 12/2012 |
| KR | 10-2013-0021518 A | 3/2013 |

* cited by examiner

*Primary Examiner* — Stuart L Hendrickson
(74) *Attorney, Agent, or Firm* — Heedong Chae; Lucem, PC

(57) ABSTRACT

The present invention includes a system and a method for the refinement of char and the manufacture of regenerated carbon black through waste tire pyrolysis, wherein, in a process of refining char obtained through a pyrolysis process of a waste tires, volatile constituents of char are preferentially removed prior to molding using a pyrolysis furnace having a continuous-type configuration and capable of operating in a continuous manner, and microparticular or microparticle-type regenerated carbon black is produced using the resulting char of increased purity as a material and then molded into spheres with water serving as a binder, whereby regenerated carbon black of high quality can be produced, with the concomitant achievement of cost reduction and an increase in output in the process of producing corresponding spherical regenerated carbon black.

4 Claims, 5 Drawing Sheets

SYSTEM AND METHOD FOR REFINEMENT OF CHAR AND MANUFACTURE OF REGENERATED CARBON BLACK THROUGH WASTE TIRE PYROLYSIS

BACKGROUND OF THE INVENTION

1. Field of the Invention

The present invention relates to a system and a method for the refinement of char and the manufacture of regenerated carbon black through waste tire pyrolysis, wherein, in a process of refining char obtained through a pyrolysis process of waste tires, volatile constituents of char are preferentially removed prior to molding using a pyrolysis furnace having a continuous-type configuration and capable of operating in a continuous manner, and microparticular or microparticle-type regenerated carbon black is produced using the resulting char of increased purity as a material and then molded into spheres with water serving as a binder, whereby regenerated carbon black of high quality can be produced, with the concomitant achievement of cost reduction and an increase in output in the process of producing corresponding spherical regenerated carbon black.

2. Description of the Prior Art

In general, pyrolysis refers to decomposition of an organic substance by indirectly heating the organic substance in an oxygen-free state. When heat is applied to a polymer organic substance, the molecular structure is destroyed, and at the same time, a pyrolysis gas is generated, and by-products converted into relatively simple low molecular materials can be obtained by condensing the generated pyrolysis gas. Examples of such by-products may include solid carbon, liquid oil, and non-condensable gas.

When thermally decomposing polymer compounds such as waste tires, waste rubbers, vinyl, plastics, and leather sludge by using a pyrolysis device for recovering oil and carbon, the gas generated during pyrolysis is discharged through an exhaust pipe, the discharged gas is cooled and refined to obtain an oil, and the pyrolysis device for the above purpose is typically configured to include a pyrolysis furnace.

A conventional pyrolysis furnace includes a solid outlet for discharging solid components that are thermally decomposed, a gas outlet for discharging gas components containing oil components, an inlet for receiving organic substances to be treated, a burner for heating an inside of the pyrolysis furnace, and a transfer device for transferring the introduced organic substances to the solid outlet.

However, since the conventional pyrolysis furnace having the above-described configuration is a batch type, it is possible to selectively close the inlet and the solid outlet, so it is suitable for maintaining the inside of the pyrolysis furnace in an oxygen-free state, but the yield rate is relatively low and the purity of the solid material is low when compared to a continuous pyrolysis furnace. For example, in the case of the waste tire, when the waste tire is thermally decomposed through the above-described batch type pyrolysis furnace, a relatively large amount of volatile components is contained in a char which is a solid material, so that the purity of the char is not high.

Meanwhile, carbon black used in the manufacture of tires is an essential additive that increases the bonding strength of rubber which is the main component of tires, and requires high purity of 99% or more.

In addition, as a method for recovering the carbon black from the waste tires, a pyrolysis process is widely used as described above.

However, the purity of the char obtained through the pyrolysis process of the waste tires is degraded to 78 to 82% due to other additives used for producing the tires.

The main reasons causing the quality degradation in the char obtained through the pyrolysis process of the waste tires are residual volatile substances introduced in the pyrolysis process and inorganic additives used as additives. The inorganic additives mainly include sulfur, zinc oxide (ZnO), magnesium oxide (MgO), silica (SiO2), calcium carbonate (CaCO3), iron oxide (Fe2O3), and the like.

Further, as described above, when the purity of the char obtained through the pyrolysis process of the waste tires is low, it leads to a degradation in the quality of the regenerated carbon black obtained from the char. Thus, there is a need to provide a method of improving the purity of the char serving as a raw material for the regenerated carbon black and producing a high-quality regenerated carbon black by using the char having the high purity.

RELATED ART DOCUMENTS

Patent Documents (Patent Document 1) Korean Registered Patent No. 10-1213754 (issued on Dec. 18, 2012), "Pyrolysis furnace".

(Patent Document 2) Korean Registered Patent No. 10-1121569 (issued on Mar. 6, 2012), "Method for upgrade-processing carbon black produced by performing a pyrolysis process on waste tires".

SUMMARY OF THE INVENTION

An embodiment of the present invention provides a system and a method for the refinement of char and the manufacture of regenerated carbon black through a pyrolysis process of waste tires, in which a process for producing the regenerated carbon black by refining the char obtained through the pyrolysis process of waste tires is continuously and sequentially performed through a series of processes in an optimum order, and as a result, the quality of the regenerated carbon black obtained through the refinement of char and molded in a spherical shape is remarkably improved.

In addition, an embodiment of the present invention provides a system and a method for the refinement of char and the manufacture of regenerated carbon black through a pyrolysis process of waste tires, in which volatile components of the char is primarily removed prior to molding during the refinement of the char obtained through the pyrolysis process of waste tires to increase the purity of the char, and then, microparticular or microparticle-type regenerated carbon black is produced using the char having the high purity as a raw material and then molded into spheres with water serving as a binder, whereby regenerated carbon black of high quality can be produced, with the concomitant achievement of cost reduction and an increase in output in the process of producing corresponding spherical regenerated carbon black.

Further, an embodiment of the present invention provides a system and a method for the refinement of char and the manufacture of regenerated carbon black through a pyrolysis process of waste tires, in which volatile components of the char obtained through the pyrolysis process of the waste tires are primarily removed by using a continuous-type pyrolysis furnace having a structure capable performing continuous operations to increase the purity of the char and the regenerated carbon black is produced by using the char as a raw material.

A system for refining char and manufacturing regenerated carbon black through waste tire pyrolysis according to one embodiment of the present invention includes: a raw material storage tank in which the char obtained through pyrolysis of waste tires is stored; a pre-treatment portion for separating foreign substances by sorting at least two times the char transferred from the raw material storage tank; a pyrolysis furnace for separating volatile components of the char transferred from the pre-treatment portion; a pulverizing portion for pulverizing the char transferred from the pyrolysis furnace into microparticular or microparticle powder to form regenerated carbon black; a molding portion for molding the regenerated carbon black transferred from the pulverizing portion into a spherical shape using water as a binder; a secondary drying portion for drying the spherical regenerated carbon black transferred from the molding portion; a vibration screen for separating the spherical regenerated carbon black having a predetermined size or more among the spherical regenerated carbon blacks transferred from the secondary drying portion; a packaging portion for packaging the spherical regenerated carbon blacks transferred from the vibration screen in a unit of a predetermined amount; and a returning portion for returning the spherical regenerated carbon black separated by the vibration screen to a process line where pulverization is performed through the pulverizing portion.

The pyrolysis furnace may include: a housing; a burner for heating an inside of the housing; a first chamber horizontally installed inside the housing in a state where one longitudinal end thereof is exposed out of the housing, in which an inlet for the char transferred from the pre-treatment portion is formed at the one longitudinal end exposed out of the housing; a second chamber disposed inside the housing in parallel to the first chamber, positioned below the first chamber, having one end arranged in a same direction as the one end formed with the inlet of the first chamber and exposed out of the housing in which an outlet for the char is formed at the exposed one end, and having an opposite end which is opposite to the outlet and connected to an opposite end of the first chamber which is opposite to the inlet of the first chamber; a first transfer portion for transferring the char flowing into the first chamber through the inlet to an opposite side; a second transfer portion for transferring the char flowing into the second chamber through the first chamber toward the outlet; and a gas release pipe having one longitudinal end connected to the one end of the first chamber opposite to the inlet to communicate with an inside of the first chamber, and an opposite longitudinal end drawn out of the housing.

In addition, the pyrolysis furnace may further include an anti-clogging portion installed in the gas release pipe to remove materials adhering to an inner surface of the gas release pipe by scraping the materials.

Further, the gas release pipe may be configured in a shape in which a horizontal pipe branches from a central portion of a vertical pipe and a lower end of the vertical pipe is connected to the first chamber, and the anti-clogging portion may include: a cylinder which is installed on an upper end of the vertical pipe and disposed such that a front end of a rod reciprocates in a longitudinal direction of the vertical pipe within the vertical pipe; and a scraper including a hub coupled to the front end of the rod of the cylinder, a ring-shaped portion having a size adapted to make contact with an inner surface of the vertical pipe, and a plurality of ribs, in which both longitudinal ends of the ribs are fixed to the hub and the ring-shaped portion, respectively.

In addition, the secondary drying portion may include a conveyor belt and may be configured to dry the spherical regenerated carbon black transferred along the conveyor belt by applying heat to the spherical regenerated carbon black.

In addition, a method for refining char and manufacturing regenerated carbon black through waste tire pyrolysis according to an embodiment of the present invention includes: transferring the char, which is obtained through pyrolysis of waste tires, from a raw material storage tank where the char is stored to a pre-treatment portion to separate foreign substances by sorting the char at least two times; transferring the char from the pre-treatment portion to a pyrolysis furnace and separating volatile components of the char by heating the char that moves along first and second chambers, which are installed in the pyrolysis furnace in parallel to each other while being spaced apart from each other in a longitudinal direction and in which both ends of the first and second chambers located in a same direction based on a longitudinal direction are connected to each other; transferring the char that has passed through the pyrolysis furnace to a pulverizing portion to form regenerated carbon black by pulverizing the char into microparticular or microparticle powder; transferring the regenerated carbon black formed through the pulverizing portion to a molding portion to form spherical regenerated carbon black using water as a binder; transferring the spherical regenerated carbon black processed through the molding portion to a secondary drying portion to dry the spherical regenerated carbon black; separating the spherical regenerated carbon black having a predetermined size or more among the spherical regenerated carbon blacks through a vibration screen after the spherical regenerated carbon black is dried through the secondary drying portion; transferring the spherical regenerated carbon black, which is not separated through the vibration screen, to a packaging portion to package the spherical regenerated carbon black in a unit of a predetermined amount; and transferring the spherical regenerated carbon black separated through the vibration screen to a process line where pulverization is performed by the pulverizing portion.

Further, the method may further include periodically removing materials adhering to an inner surface of a gas release pipe of the pyrolysis furnace by using a cylinder and a scraper that reciprocates along the inner surface of the gas release pipe through power of the cylinder.

According to an embodiment of the present invention, the process for producing the regenerated carbon black by refining the char obtained through the pyrolysis process of waste tires is continuously and sequentially performed through a series of processes in an optimum order, and as a result, the quality of the regenerated carbon black obtained through the refinement of char and molded in a spherical shape can be remarkably improved.

In addition, volatile components of the char are primarily removed prior to molding during the refinement of the char obtained through the pyrolysis process of waste tires to increase the purity of the char, and then, microparticular or microparticle-type regenerated carbon black is produced using the char having the high purity as a raw material and then molded into spheres with water serving as a binder, whereby regenerated carbon black of high quality can be produced, with the concomitant achievement of cost reduction and an increase in output in the process of producing corresponding spherical regenerated carbon black.

Further, volatile components of the char obtained through the pyrolysis process of the waste tires can be primarily removed by using a continuous-type pyrolysis furnace having a structure capable performing continuous operations to increase the purity of the char and the regenerated carbon black can be produced by using the char as a raw material, so that the regenerated carbon black produced as a final product may have the high quality.

DETAILED DESCRIPTION OF THE INVENTION

Figure 1:
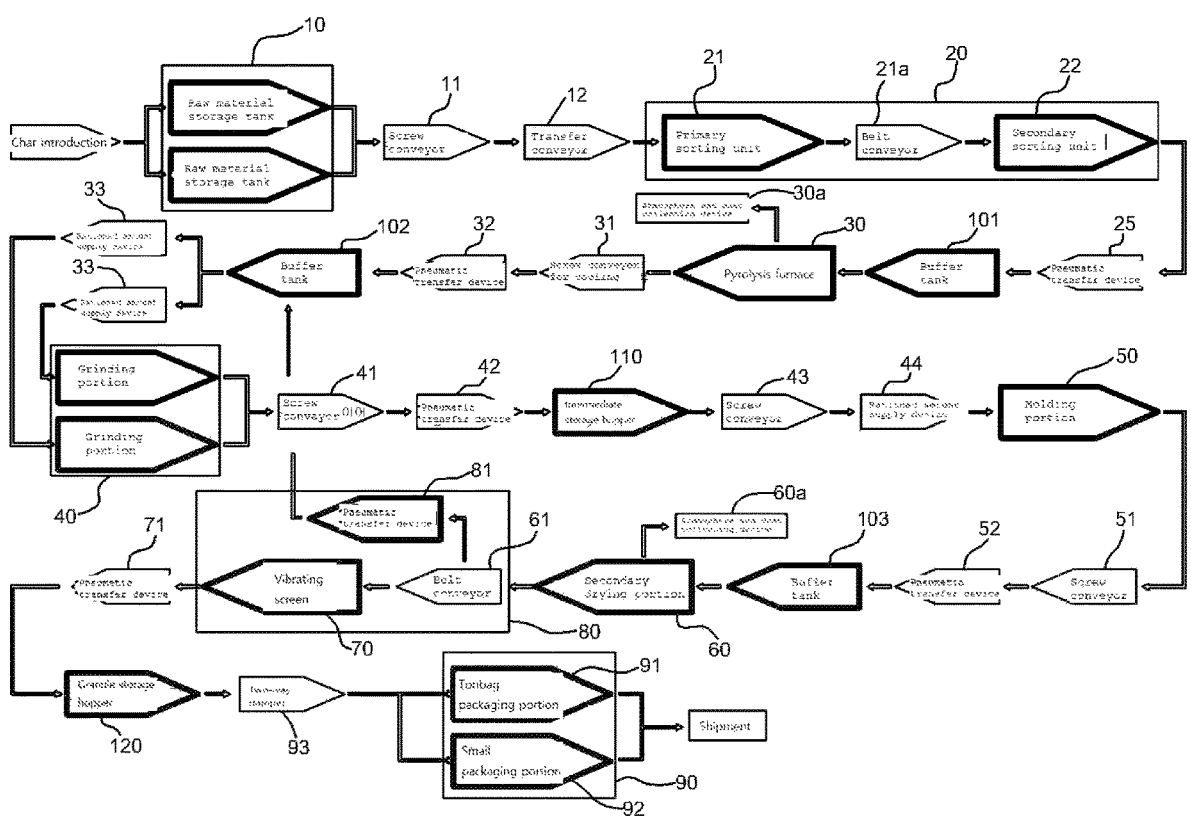
FIG. 1 is a block diagram illustrating a system for the refinement of char and the manufacture of regenerated carbon black through waste tire pyrolysis according to an embodiment of the present invention.

The following detailed description of the present invention is an embodiment in which the present invention may be implemented and reference is made to the accompanying drawings shown as examples of the embodiment. These embodiments are described in detail so that those skilled in the art may readily implement the present invention. It should be understood that the various embodiments of the present invention are different, but need not be mutually exclusive. For example, the specific shapes, structures, and properties described herein in relation to one embodiment may be implemented in other embodiments without departing from the spirit and scope of the present invention. In addition, it should be understood that the position or arrangement of individual components in each embodiment may be changed without departing from the spirit and scope of the present invention.

Accordingly, the detailed description to be described below is not intended to be taken in a limiting sense, and if appropriately described, the scope of the present invention is limited only by the appended claims and equivalents thereof. Like reference numerals in the drawings refer to the same or similar functions throughout the several aspects.

Although the terms used in the present invention are preferably selected with general terms which are widely used at present under the consideration of functions in the present invention, the terms may vary according to the intention of those of ordinary skill in the art, judicial precedents, or introduction of new technology. In addition, in a specific case, the applicant arbitrarily may select terms, and in this case, the meaning of the terms will be disclosed in a corresponding part of the detailed description of the invention in detail. Thus, the terms used in the present disclosure should be defined not by the simple names of the terms, but by the meaning of the terms and the contents throughout the present disclosure.

Throughout the specification, when a certain part 'includes' a certain element, unless explicitly described to the contrary, it means that other elements may be further included but not excluded. In addition, the term disclosed herein such as "unit" or "module" indicates a portion for processing at least one function or operation, and may be implemented in hardware, software, or a combination of hardware and software.

Hereinafter, a system and a method for refining carbon black through pyrolysis of waste tires according to embodiments of the present invention will be described with reference to FIGS. 1 to 5.

First, a system for the refinement of char and the manufacture of regenerated carbon black through waste tire pyrolysis according to an embodiment of the present invention will be described with reference to FIGS. 1 to 3.

FIG. 1 is a block diagram illustrating a system for the refinement of char and the manufacture of regenerated carbon black through waste tire pyrolysis according to an embodiment of the present invention.

As shown in the drawing, the system for the refinement of char and the manufacture of regenerated carbon black through waste tire pyrolysis according to an embodiment of the present invention may include a raw material storage tank 10, a pre-treatment portion 20, a pyrolysis furnace 30, a pulverizing portion 40, a molding portion 50, a secondary drying portion 60, a vibration screen 70, a returning portion 80, and a packaging portion 90. In addition, the system for the refinement of char and the manufacture of regenerated carbon black through waste tire pyrolysis according to an embodiment of the present invention may include buffer tanks 101, 102, and 103, an intermediate storage hopper 110, and a granule storage hopper 120.

The char obtained through pyrolysis of waste tires may be stored in the raw material storage tank 10. In the present embodiment, the raw material storage tank 10 is configured as a silo, but the present invention is not limited thereto.

The pre-treatment portion 20 may separate foreign substances from the char transferred from the raw material storage tank 10 by sorting the char at least two times. The pre-treatment portion 20 may include a primary sorter 21 that separates the foreign substances by vibrating the char transferred from the raw material storage tank 10 and a second sorter 22 that separates magnetic materials from the char transferred from the primary sorter 21 by using magnetic force, in which the primary sorter 21 may include a belt conveyor 21a having the vibration function.

In addition, the char may be transferred from the raw material storage tank 10 to the pre-treatment portion 20 by a screw conveyor 11 connected to the raw material storage tank 10 and a transfer conveyor 12 having one end connected to the screw conveyor 11 and the other end connected to the primary sorter 21 of the pre-treatment portion 20.

The pyrolysis furnace 30 may separate volatile components of char transferred from the pre-treatment portion 20. The pyrolysis furnace 30 may include an air and dust collector 30a.

In addition, the char may be transferred from the pre-treatment portion 20 to the pyrolysis furnace 30 through a pneumatic transfer device 25 using pneumatic pressure such as an air compressor.

Further, a buffer tank 101 may be installed on a char transfer line between the pre-treatment portion 20 and the pyrolysis furnace 30, and accordingly, the char transferred from the pre-treatment portion 20 may be primarily stored in the buffer tank 101 and then transferred to the pyrolysis furnace 30.

Figure 2:
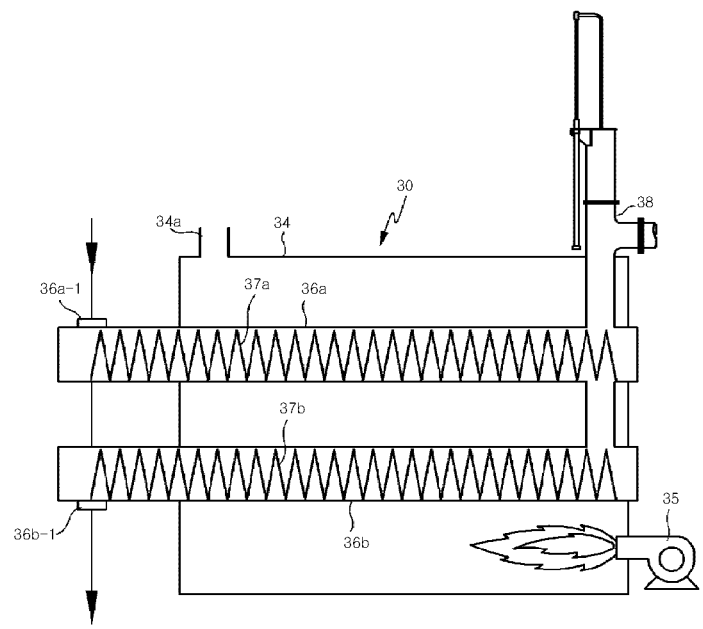
FIG. 2 is a schematic view of a pyrolysis furnace used in a system for the refinement of char and the manufacture of regenerated carbon black through waste tire pyrolysis according to an embodiment of the present invention.
Figure 3:
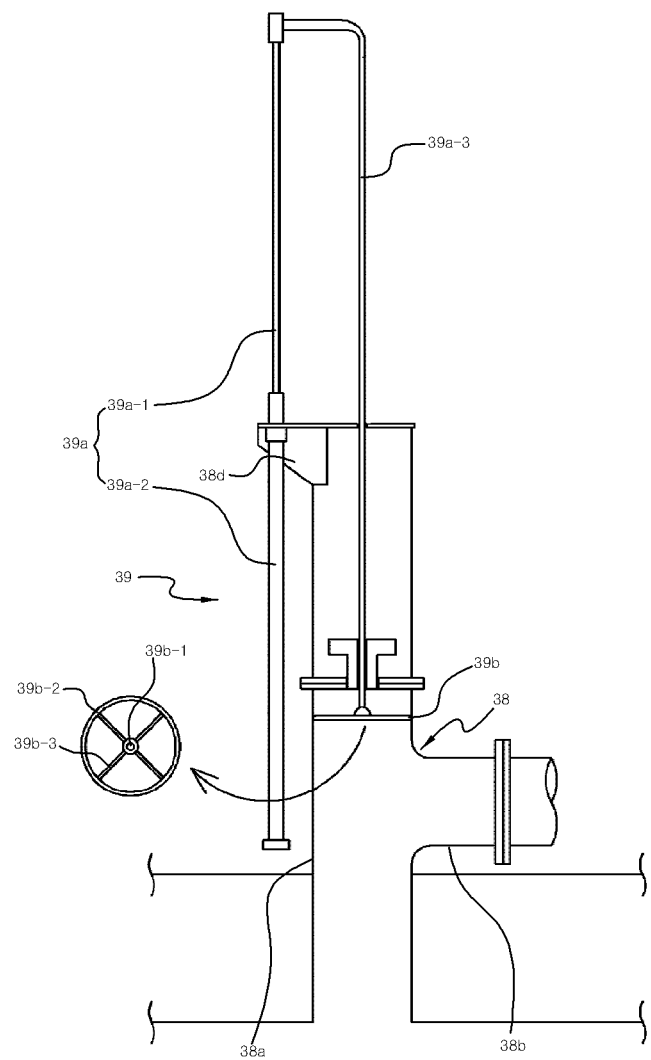
FIG. 3 is a view illustrating a main portion of a pyrolysis furnace according to the embodiment shown in FIG. 2.

FIGS. 2 and 3 illustrate one embodiment of the pyrolysis furnace 30 described above, and the detailed configuration of the pyrolysis furnace 30 will be described with reference to FIGS. 2 and 3.

FIG. 2 is a schematic view of the pyrolysis furnace used in a system for the refinement of char and the manufacture of regenerated carbon black through waste tire pyrolysis according to an embodiment of the present invention and FIG. 3 is a view illustrating a main portion of the pyrolysis furnace according to the embodiment shown in FIG. 2.

As shown in the drawings, the pyrolysis furnace 30 may include a housing 34, a burner 35, a first chamber 36a, a second chamber 36b, a first transfer portion 37a, a second transfer portion 37b, and a gas release pipe 38. In addition, the pyrolysis furnace 30 may further include an anti-clogging portion 39.

The housing 34 may form an outer appearance of the pyrolysis furnace 30, that is, the housing 34 may form a basic body of the pyrolysis furnace 30. In addition, an exhaust gas outlet 34a for discharging exhaust gas of the burner 35 may be formed on an upper portion of the housing 34, which will be described below.

The burner 35 may have the function of heating an inside of the housing 34. In the present embodiment, as an example, the burner 35 may be formed at a lower side of the housing 34, but the present invention is limited thereto. The burner 35 may be installed in one of various locations with various structures so far as the burner 35 can heat the inside of the housing 34.

The first chamber 36a may be horizontally installed inside the housing 34 in a state in which one longitudinal end of the first chamber 36a is exposed out of the housing 34, and an inlet 36a-1 for the char transferred from the pre-treatment portion 20 of FIG. 1 may be formed at the one longitudinal end exposed out of the housing 34.

The second chamber 36b may be disposed inside the housing 34 in parallel to the first chamber 36a and installed below the first chamber 36a. The second chamber 36b may have one end arranged in the same direction as the one end formed with the inlet 36a-1 of the first chamber 36 and exposed out of the housing 34 in which an outlet 36b-1 for the char is formed at the exposed one end. In addition, the second chamber 36b may have an opposite end which is opposite to the outlet 36b-1 and connected to an opposite end of the first chamber 36a which is opposite to the inlet of the first chamber 36a.

The first transfer portion 37a may have the function of transferring the char, which flows into the first chamber 36a through the inlet 36a-1 of the first chamber 36a, in the opposite direction. In the present embodiment, the first transfer portion 37a may be configured as a transfer screw installed in the longitudinal direction of the first chamber 36a, but the present invention is not limited thereto, and the first transfer portion 37a may have various configurations so far as the first transfer portion 37a can move the char in one direction in the first chamber 36a.

The second transfer portion 37b may transfer the char, which flows into the second chamber 36b through the first chamber 36b, toward the outlet 36b-1 of the second chamber 36b. In the present embodiment, the second transfer portion 37b may be configured as a transfer screw installed in the longitudinal direction of the second chamber 36b, but the present invention is not limited thereto, and the second transfer portion 37b may have various configurations so far as the second transfer portion 37b can move the char in one direction in the second chamber 36b.

The gas release pipe 38 may have one longitudinal end connected to the one end of the first chamber 36a opposite to the inlet 36a-1 to communicate with an inside of the first chamber 36a, and an opposite longitudinal end drawn out of the housing 34. The gas release pipe 38 may be connected to equipment (not shown) that extracts oil contained in the gas.

The anti-clogging portion 39 may be installed in the gas release pipe 38 to remove materials adhering to an inner surface of the gas release pipe 38 by scraping.

In addition, the anti-clogging portion 39 may include a cylinder 39a and a scraper 39b. In order to install the anti-clogging portion 39 including the cylinder 39a and the scraper 39b, the gas release pipe 38 may be configured in a shape in which a horizontal pipe 38b branches from a central portion of a vertical pipe 38a and a lower end of the vertical pipe 38a is connected to the first chamber 36a. The horizontal pipe 38b may be connected to equipment (not shown) that extracts oil contained in the gas.

Accordingly, the cylinder 39a may be installed on an upper end of the vertical pipe 38a of the gas release pipe 380, and at the same time, a front end of a rod 39a-1 of the cylinder 39a may reciprocate in the longitudinal direction of the vertical pipe 38a of the gas release pipe 38 within the vertical pipe 38a.

In addition, the scraper 39b may include a hub 39b-1 coupled to the front end of the rod 39a-1 of the cylinder 39a, a ring-shaped portion 39b-2 having a size adapted to make contact with an inner surface of the vertical pipe 38a, and a plurality of ribs 39b-3, in which both longitudinal ends of the ribs 39b-3 are fixed to the hub 39b-1 and the ring-shaped portion 39b-2, respectively.

More specifically, regarding the configuration of the cylinder 39a, the cylinder 39a may include a cylinder body 39a-2, which is fixedly installed to a bracket 38d coupled to one side of the vertical pipe 38a of the gas release pipe 38a, and an inverse L-shaped rod 39a-3 having one longitudinal end coupled to the front end of the rod 39a-1 of the cylinder body 39a-2 and an opposite longitudinal end extending into the vertical pipe 38a of the gas release pipe 38 by passing through a horizontal cover plate 38c. The horizontal cover plate 38c may have the function of closing the upper end of the vertical pipe 38a of the gas release pipe 38, and the bracket 38d may be fixed to one side of the horizontal cover plate 38c. In addition, the scraper 39b may be coupled to the front end of the inverse L-shaped rod 39a-3.

Referring to the operation of the pyrolysis furnace 30 having the above-described configuration, the char introduced into the first chamber 36a through the inlet 36a-1 of the first chamber 36a may be transferred in a direction opposite to the inlet 36a-1 by the first transfer portion 37a, and the char may be heated by the burner 35 while being transferred.

Then, the char transferred through the first chamber 36a may flow into the inside of the second chamber 36b connected to the first chamber 36a, and thus the char flowing into the second chamber 36b may be transferred toward the outlet 36b-1 of the second chamber 36b by the second transfer portion 37b and heated by the burner 35 while being transferred. Then, the char moved along the second chamber 36b may be discharged through the outlet 36b-1 of the second chamber 36b and transferred to the pulverizing portion 40 to be described below.

In addition, the gas that is thermally decomposed as the char is transferred through the first chamber 36a and the second chamber 36*b* may be discharged to oil extraction equipment via the vertical pipe 38*a* and the horizontal pipe 38*b* of the gas release pipe 38.

Then, the anti-clogging portion 39 may be periodically operated, and accordingly, the inverse L-shaped rod 39*a*-3 interworking with the rod 39*a*-1 of the cylinder body 39*a*-2 may reciprocate up and down along the vertical pipe 38*a* of the gas release pipe 38. As the inverse L-shaped rod 39*a*-3 reciprocates up and down, the scraper 39*b* may also reciprocate up and down, so that solid materials sticking to the inner surface of the vertical pipe 38*a*, that is, carbon particles that are scattered and adhered to the inner surface of the vertical pipe 38*a* together with the oil may be scraped off.

Returning again to FIG. 1, the pulverizing portion 40 may pulverize the char transferred from the pyrolysis furnace 30 into microparticular or microparticle powder to form regenerated carbon black.

In addition, the char may be transferred from the pyrolysis furnace 30 to the pulverizing portion 40 by a cooling screw conveyor 31 for cooling and transferring the char discharged through the pyrolysis furnace 30 and a pneumatic transfer device 32 for transferring the char from the cooling screw conveyor 31 to the pulverizing portion 40 by using pneumatic pressure. In addition, the buffer tank 102 for primarily storing the char transferred from the pneumatic transfer device 32 and a quantitative supply device 33 for quantitatively supplying the char transferred from the buffer tank 102 in a unit of a predetermined amount may be further provided. Accordingly, the char that is primarily stored in the buffer tank 102 may be sequentially supplied to the pulverizing portion 40 in a unit of a predetermined amount through the quantitative supply device 33.

The molding portion 50 may process the regenerated carbon black transferred from the pulverizing part 40 into a spherical shape using water as a binder.

In addition, the regenerated carbon black may be transferred from the pulverizing portion 40 to the molding portion 50 by a screw conveyor 41 for transferring the regenerated carbon black discharged from the pulverizing portion 40 and a pneumatic transfer device 42 for transferring the regenerated carbon black from the screw conveyor 41 to the molding portion 50 by using pneumatic pressure. In addition, an intermediate storage hopper 110 for primarily storing the regenerated carbon black discharged from the intermediate storage hopper 110, a screw conveyer 43 for transferring the regenerated carbon black discharged from the intermediate storage hopper 110, and a quantitative supply device 44 for quantitatively supplying the regenerated carbon black transferred from the screw conveyor 43 to the molding portion in a unit of a predetermined amount may be further provided. Accordingly, the regenerated carbon black that is primarily stored in the intermediate storage hopper 110 may be sequentially supplied to the molding portion 40 in a unit of a predetermined amount through the quantitative supply device 44.

The secondary drying portion 60 may have a function of drying the spherical regenerated carbon black transferred from the molding portion 50. The secondary drying portion may include a conveyor belt so that the spherical regenerated carbon black may be dried by heat applied to the spherical regenerated carbon black transferred along the conveyor belt. In addition, the secondary drying portion 60 may include an air and dust collector 60*a*.

Further, the spherical regenerated carbon black may be transferred from the molding portion 50 to the secondary drying portion 60 by a screw conveyor 51 for transferring the spherical regenerated carbon black discharged from the molding portion 50 and a pneumatic transfer device 52 for transferring the spherical regenerated carbon black from the screw conveyor 51 to the secondary drying portion 60 by using pneumatic pressure. In addition, a buffer tank 103 for primarily storing the spherical regenerated carbon black transferred from the pneumatic transfer device 52 may be installed. Accordingly, after the spherical regenerated carbon black has been primarily stored in the buffer tank 103, the spherical regenerated carbon black of 103 may be transferred to the secondary drying portion 60.

The vibration screen 70 may separate the spherical regenerated carbon black having a predetermined size or more from among the spherical regenerated carbon blacks transferred from the secondary drying portion 60.

The spherical regenerated carbon black may be transferred from the secondary drying portion 60 to the vibration screen 70 through a belt conveyor 61.

The returning portion 80 may transfer the spherical regenerated carbon black separated by the vibration screen 70 to a process line where pulverization is performed through the pulverizing portion 40. The returning portion 80 may include a pneumatic transfer device 81 to transfer the spherical regenerated carbon black separated by the vibration screen 70 to a pulverization process line through the pulverizing portion 40 by using pneumatic pressure.

The packaging portion 90 may pack the spherical regenerated carbon black transferred from the vibration screen 70 in a unit of a predetermined amount.

In addition, the spherical regenerated carbon black may be transferred from the vibration screen 70 to the packaging portion 90 by a pneumatic transfer device 71 that transfers the spherical regenerated carbon black discharged from the vibration screen 70 to the packaging portion 90 by using pneumatic pressure. In this case, a granule storage hopper 120 may be installed on a spherical regenerated carbon black transfer line between the vibration screen 70 and the packaging portion 90. Accordingly, the spherical regenerated carbon black transferred from the vibration screen 70 may be primarily stored in the granule storage hopper 120, and then the spherical regenerated carbon black of the granule storage hopper 120 may be transferred to the packaging portion 90.

Further, the packaging portion 90 may include a ton bag packaging portion 91 and a small packaging portion 92, and thus, the granule storage hopper 120 and the packaging portion 90 may be connected to each other through a two-way damper 93. The spherical regenerated carbon black may be selectively transferred to the ton bag packaging portion 91 or the small packaging portion 92 through the two-way damper 93.

According to the above configuration, the operation for manufacturing the regenerated carbon black by refining the char obtained through the pyrolysis process of the waste tires may be continuously and sequentially performed through a series of processes in the optimum order. As a result, the char can be refined with a high quality and the spherical regenerated carbon black may have high quality.

In addition, in the process of refining the char obtained through the pyrolysis process of waste tires, volatile components of the char can be primarily removed prior to molding to increase the purity of the char, and then the microparticular or microparticle-type regenerated carbon black can be produced by using the char having the purity as a raw material and then molded into spheres with water serving as a binder, whereby the spherical regenerated carbon black can be produced while reducing the cost and increasing the productivity.

Further, volatile components of the char obtained through the pyrolysis process of the waste tires can be primarily removed before molding to improve the purity of the char by using the continuous-type pyrolysis furnace, which has a structure capable of performing the continuous operation, and the regenerated carbon black can be produced by using the char as a raw material, and thus, the final regenerated carbon black may have a high quality.

Next, the description will be made with reference to FIGS. 4 and 5 for explaining a method for the refinement of the char and the manufacture of the regenerated carbon black through waste tire pyrolysis according to an embodiment of the present invention.

Figure 4:
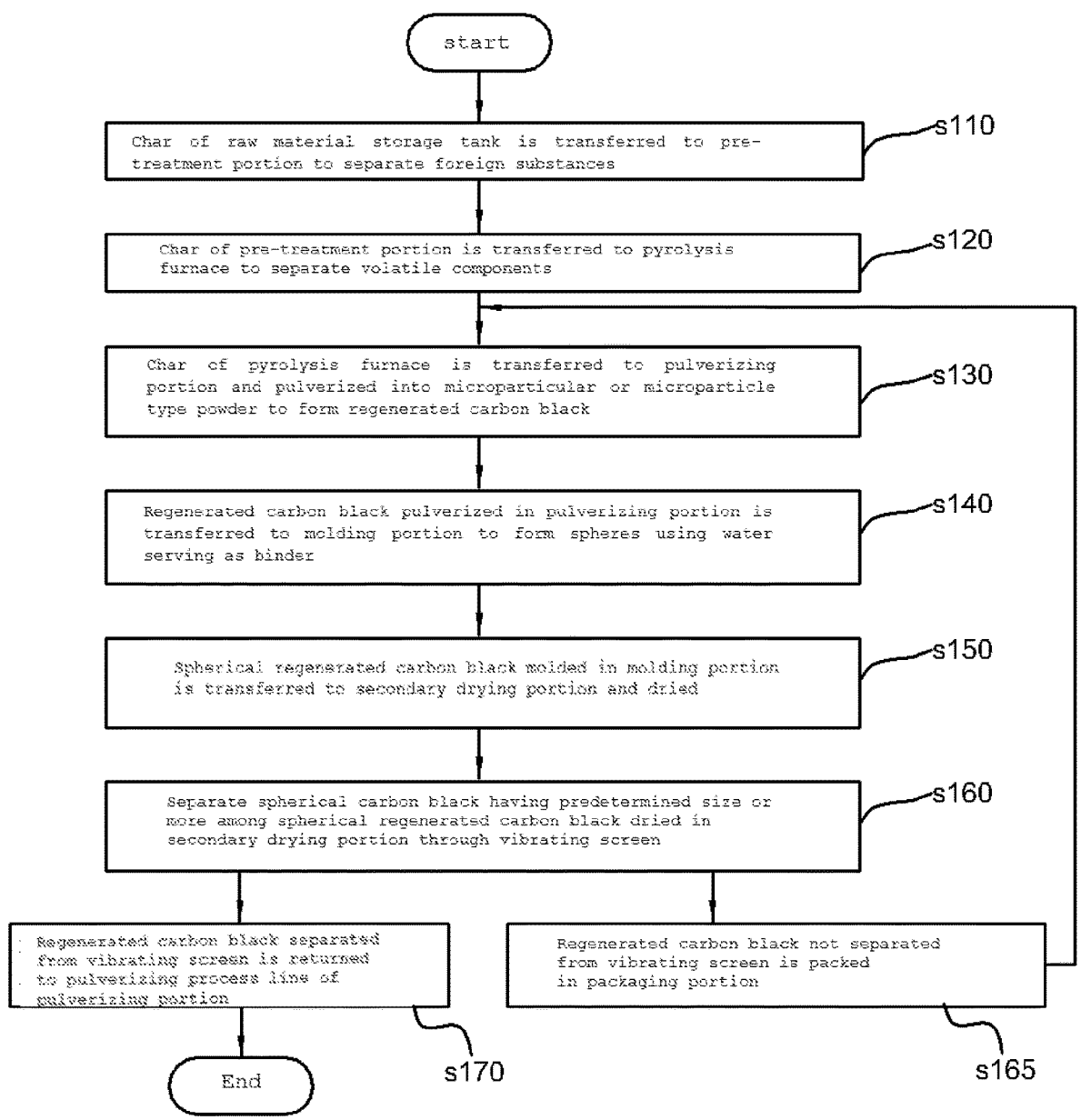
FIG. 4 is a flowchart illustrating a method for the refinement of char and the manufacture of regenerated carbon black through waste tire pyrolysis according to an embodiment of the present invention.

FIG. 4 is a flowchart illustrating the method for refinement of the char and the manufacture of the regenerated carbon black through waste tire pyrolysis according to an embodiment of the present invention.

As shown in the drawings, in step S110, the char, which is obtained through pyrolysis of waste tires, may be transferred from the raw material storage tank where the char is stored to the pre-treatment portion to separate foreign substances by sorting the char at least two times.

For details of step S110, referring to FIG. 3, a primary sorting step is performed in step S111 so that foreign substances are separated from the char transferred from the raw material storage tank through vibration. Then, a second sorting step is performed in step S112 so that magnetic materials are separated from the char that has undergone the first sorting step in step S111 by using magnetic force.

Returning again to FIG. 4, in step S120, the char is transferred from the pre-treatment portion to the pyrolysis furnace and volatile components of the char are separated by heating the char that moves along first and second chambers, which are installed in the pyrolysis furnace in parallel to each other while being spaced apart from each other in a longitudinal direction and in which both ends of the first and second chambers located in the same direction based on a longitudinal direction are connected to each other;

In step S130, the char is transferred from the pyrolysis furnace to the pulverizing portion to form the regenerated carbon black by pulverizing the char into microparticular or microparticle powder;

In step S140, the regenerated carbon black formed through the pulverizing portion is transferred to the molding portion and is molded into a spherical shape by using water as a binder.

In step S150, the spherical regenerated carbon black molded through the molding portion is transferred to the secondary drying portion so that the spherical regenerated carbon black is dried through a fluidized bed drying method.

In step S160, the spherical regenerated carbon black having a predetermined size or more among the spherical regenerated carbon blacks dried through the secondary drying portion is separated through a vibration screen.

In step S170, the spherical regenerated carbon black that is not separated through the vibration screen is transferred to the packaging portion and packed in a unit of a predetermined amount.

In addition, in step S165, the spherical regenerated carbon black separated through the vibration screen is transferred to a process line where pulverization is performed by the pulverizing portion. Then, the spherical regenerated carbon black transferred in this way is subject to above steps S130 to S150 and then goes through step S160. When the spherical regenerated carbon black is not separated through the vibration screen in step S160, the process goes to step S170.

In this case, above-described steps S130 and S140 may include a step of sequentially supplying a predetermined amount of char or regenerated carbon black in a predetermined amount to the pulverizing portion or the molding portion through the quantitative supply device.

In addition, although not shown in the drawings, the method for refining the char and manufacturing the regenerated carbon black through waste tire pyrolysis according to an embodiment of the present invention may further include a step of periodically removing materials adhering to an inner surface of the gas release pipe of the pyrolysis furnace by using the cylinder and the scraper that reciprocates along the inner surface of the gas release pipe through power of the cylinder.

Figure 5:
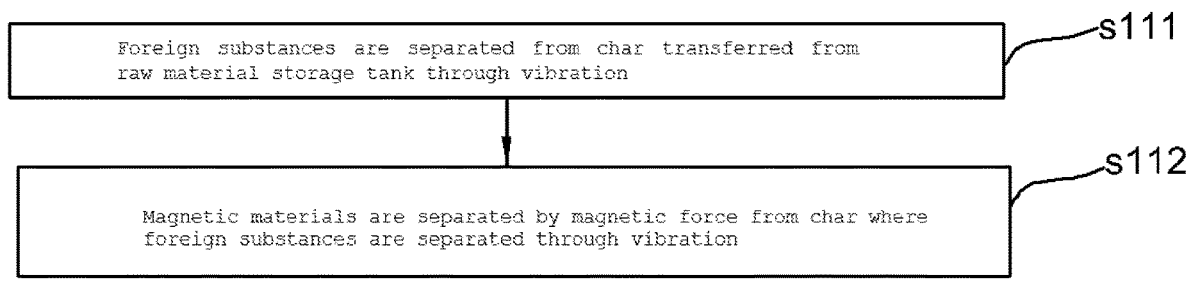
FIG. 5 is a flowchart illustrating details of some processes in a method for the refinement of char and the manufacture of regenerated carbon black through waste tire pyrolysis according to an embodiment of the present invention.

As described above, the operation of the method for refining the char and manufacturing the regenerated carbon black through waste tire pyrolysis described with reference to FIGS. 4 and 5 is substantially the same as the method for refining the char and manufacturing the regenerated carbon black through waste tire pyrolysis described with reference to FIGS. 1 to 3, so the detailed description thereof will be omitted.

As mentioned above, in the present description, specific matters such as specific components and the like have been described with reference to several embodiments and drawings, but they are provided only to help a more comprehensive understanding of the present invention, so the present invention is not limited to the above embodiments, and those skilled in the art to which the present invention pertains can make various modifications and variations from the above description.

Therefore, the spirit of the present invention is not limited to the described embodiments and it can be understood that not only the claims described below, but also equivalents thereof may fall within the scope of the spirit of the present invention.

What is claimed is:

1. A system for refining char and manufacturing carbon black through waste tire pyrolysis, the system comprising:
   a raw material storage tank in which the char obtained through pyrolysis of waste tires is stored;
   a pre-treatment portion for separating foreign substances by sorting at least two times the char transferred from the raw material storage tank;
   a pyrolysis furnace for separating volatile components of the char transferred from the pre-treatment portion;
   a pulverizing portion for pulverizing the char transferred from the pyrolysis furnace into microparticular or microparticle powder to form carbon black;
   a molding portion for molding the carbon black transferred from the pulverizing portion into a spherical shape using water as a binder;
   a secondary drying portion for drying the spherical carbon black transferred from the molding portion;
   a vibration screen for separating the spherical carbon black having a predetermined size or more among the spherical carbon blacks transferred from the secondary drying portion;
   a packaging portion for packaging the spherical carbon blacks transferred from the vibration screen in a unit of a predetermined amount; and
   a returning portion for returning the spherical carbon black separated by the vibration screen to a process line where pulverization is performed through the pulverizing portion,
   wherein the pyrolysis furnace comprises:
   a housing;

a burner for heating an inside of the housing;

a first chamber horizontally installed inside the housing in a state where one longitudinal end thereof is exposed out of the housing, in which an inlet for the char transferred from the pre-treatment portion is formed at the one longitudinal end exposed out of the housing;

a second chamber disposed inside the housing in parallel to the first chamber, positioned below the first chamber, having one end arranged in a same direction as the one end formed with the inlet of the first chamber and exposed out of the housing in which an outlet for the char is formed at the exposed one end, and having an opposite end which is opposite to the outlet and connected to an opposite end of the first chamber which is opposite to the inlet of the first chamber;

a first transfer portion for transferring the char flowing into the first chamber through the inlet to an opposite side;

a second transfer portion for transferring the char flowing into the second chamber through the first chamber toward the outlet; and a gas release pipe having one longitudinal end connected to the one end of the first chamber opposite to the inlet to communicate with an inside of the first chamber, and an opposite longitudinal end drawn out of the housing.

2. The system of claim 1, wherein the pyrolysis furnace further comprises an anti-clogging portion installed in the gas release pipe to remove materials adhering to an inner surface of the gas release pipe by scraping the materials.

3. The system of claim 2, wherein the gas release pipe is configured in a shape in which a horizontal pipe branches from a central portion of a vertical pipe and a lower end of the vertical pipe is connected to the first chamber, and the anti-clogging portion includes:
- a cylinder which is installed on an upper end of the vertical pipe and disposed such that a front end of a rod reciprocates in a longitudinal direction of the vertical pipe within the vertical pipe; and
- a scraper including a hub coupled to the front end of the rod of the cylinder, a ring-shaped portion having a size adapted to make contact with an inner surface of the vertical pipe, and a plurality of ribs, in which both longitudinal ends of the ribs are fixed to the hub and the ring-shaped portion, respectively.

4. The system of claim 1, wherein the secondary drying portion includes a conveyor belt and is configured to dry the spherical carbon black transferred along the conveyor belt by applying heat to the spherical carbon black.

* * * * *